(12) United States Patent
Tucker et al.

(10) Patent No.: US 7,195,307 B2
(45) Date of Patent: Mar. 27, 2007

(54) HINGE FOR VEHICLE HOOD

(75) Inventors: Eric N. Tucker, Denton, TX (US); Joseph F. Marrs, Aubrey, TX (US)

(73) Assignee: PACCAR Inc, Bellevue, WA (US)

( * ) Notice: Subject to any disclaimer, the term of this patent is extended or adjusted under 35 U.S.C. 154(b) by 246 days.

(21) Appl. No.: 11/083,153

(22) Filed: Mar. 17, 2005

(65) Prior Publication Data
US 2006/0208528 A1 Sep. 21, 2006

(51) Int. Cl.
B62D 25/12 (2006.01)
(52) U.S. Cl. .............................. 296/190.05; 296/193.11; 464/83; 16/225; 180/69.21; 180/89.18
(58) Field of Classification Search ........... 296/190.05, 296/193.11; 464/83; 403/228, 372, 225, 403/226, 227; 180/69.21, 89.17, 69.2, 89.18; 16/225
See application file for complete search history.

(56) References Cited
U.S. PATENT DOCUMENTS

| | | | |
|---|---|---|---|
| 2,712,742 A | | 7/1955 | Neidhart |
| 3,380,773 A | * | 4/1968 | Sewelin .................. 296/190.05 |
| 3,482,464 A | * | 12/1969 | Angst et al. ................... 74/470 |
| 3,837,610 A | * | 9/1974 | Ewers ......................... 248/609 |
| RE28,259 E | * | 12/1974 | Henschen .................... 267/279 |
| 4,097,958 A | | 7/1978 | Van Dell |
| 5,591,083 A | * | 1/1997 | Kirschey ...................... 464/83 |
| 5,967,597 A | * | 10/1999 | Vander Kooi et al. .. 296/190.07 |
| 5,975,228 A | | 11/1999 | Parfitt |
| 6,125,559 A | * | 10/2000 | Mullenhour .................. 37/232 |
| 6,758,294 B2 | * | 7/2004 | Peddycord et al. ....... 180/89.12 |

* cited by examiner

Primary Examiner—Jason Morrow
(74) Attorney, Agent, or Firm—Sidley Austin LLP

(57) ABSTRACT

A hinge is provided suitable for attaching a hood to a car or truck. The hinge includes generally tubular members sharing a common axis of rotation. Elastomeric elements interposed between the tubular members provide isolation between the parts of the hinge. Relative rotation between the tubular members compresses the elastomeric elements creating a spring-force opposing the relative rotation. The hood, hinge, and vehicle may be configured so that the spring-force of the elastomeric elements assists in opening and/or closing of the hood.

20 Claims, 4 Drawing Sheets

HINGE FOR VEHICLE HOOD

The present invention generally relates to a revolute joint or hinge, and more particularly to a revolute joint or hinge for the hood or trunk of a motor vehicle.

BACKGROUND OF THE INVENTION

Movable panels or covers, such as hoods and trunk lids, are typically attached to the body or frame of a motor vehicle by means of one or more hinges, pins, or other type of revolute joint. Such movable panels or covers provide easy access to otherwise covered and hidden parts of the vehicle, such as the engine and trunk. The panels may possess considerable weight. For example, the hood of a large truck may exceed 100 pounds. Significant effort may be required to open or close a heavy panel or cover. In addition, a heavy panel or cover may cause injury should it fall open or shut in an uncontrolled manner.

To reduce the effort of opening such panels and reduce the risk of injury, it is often desirable to provide a force about the pivot axis of the hinge to counteract the weight of the panel. Typically the counteracting force is provided by springs which are arranged so that they are operative at the fully opened and closed positions of the vehicle panel. For example, extension springs may be arranged so that they are stretched when the hood of an automobile is fully closed and so that the stretching of the springs creates a force about the pivot axis of the hinge which tends to assist a user in lifting the hood to an open position. Other lift assisting mechanisms may employ arrangements of compression springs, coil springs, gas-springs, torsion-bars and the like.

However, such mechanisms for reducing the effort needed to open or close a vehicle panel require many parts in addition to the parts needed merely to provide the hinged motion. The additional parts add to vehicle weight and complexity and may increase vehicle manufacturing, maintenance, and operating costs. Accordingly, it would be desirable to provide a simple hinged or revolute joint that provides assistance in opening or closing a panel or cover without the need for additional parts.

In addition to the foregoing, it is also often desirable to isolate panels and covers from other parts of the vehicle structure to accommodate relative motion between them. For example, vehicle bodies and frames flex and vibrate as the vehicle is driven over a roadway. Vehicle bodies and frames also bend and flex due to differences in the thermal expansion characteristics of various component parts of the vehicle body or frame. Flexing may cause the mounting points between a movable panel or cover and the vehicle body to move relative to each other. The relative motion of the mounting points may create significant and potentially destructive stresses in the panel. Isolating the panel from the mounting points may reduce the stresses imparted to the panel.

One means of isolating a panel is to provide an elastomeric resilient mount between the panel and mounting point. For example, rubber grommets may be provided around the bolts attaching a panel to a hinge. Such isolation mounts provide for limited motion between the panel and the mounting points. Another means of isolating the panel from the mounting points includes providing cylindrical elastomeric bushings located concentric with the pivot axis of the hinge. Yet another isolation method is to provide an additional hinge joint having an axis substantially aligned with the longitudinal axis of the vehicle. Combinations of these isolation techniques may also be used.

However, such isolation techniques also require many parts in addition to those merely needed to provide for hinged motion of the vehicle panel with respect to the vehicle body or frame. The additional parts also add to vehicle weight and complexity and may increase vehicle manufacturing, maintenance, and operating costs. Accordingly, it would be desirable to provide a hinged or revolute joint that provides isolation between the motion of the body or frame of a motor vehicle and a panel or cover attached to the vehicle.

SUMMARY OF THE INVENTION

The above and other objects and advantages of the present invention are provided by an arrangement of tubes and elastomeric bushings. The tubes generally have a square cross-section and are juxtaposed in concentric and overlapping relation to each other. Pairs of concentric tubes are rotated along their longitudinal axis relative to each other so that corners of an inner tube are adjacent to the sides of an outer tube. Elastomeric bushings are inserted between the inner and outer tubes in the spaces adjacent to the sides of the inner tube.

BRIEF DESCRIPTION OF THE DRAWINGS

The above and other objects and advantages of the present invention will be understood upon consideration of the following detailed description taken in conjunction with the accompanying drawings, in which like reference characters refer to like parts throughout and in which.

DETAILED DESCRIPTION

Figure 1:
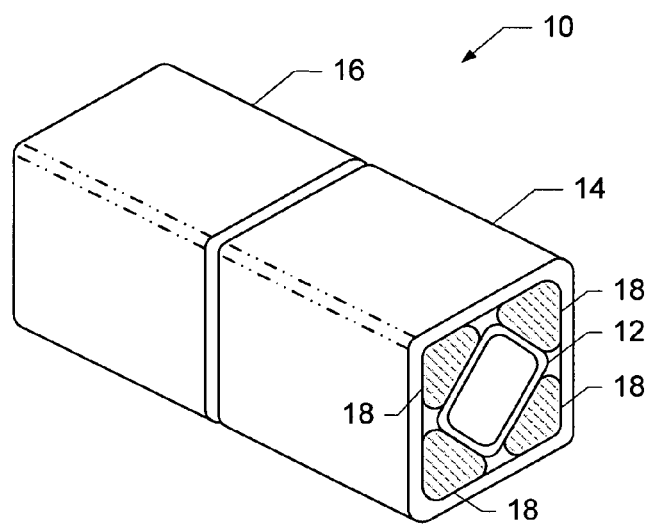
FIG. 1 is an oblique view of an illustrative embodiment of a hinge joint in accordance with the principles of the present invention.
Figure 2A:
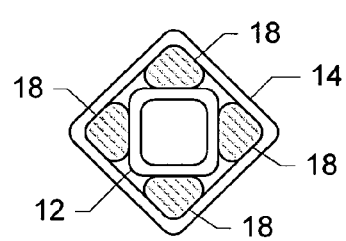
FIGS. 2A and 2B are, respectivley, end and side views of the hinge of FIG. 1.
Figure 2B:
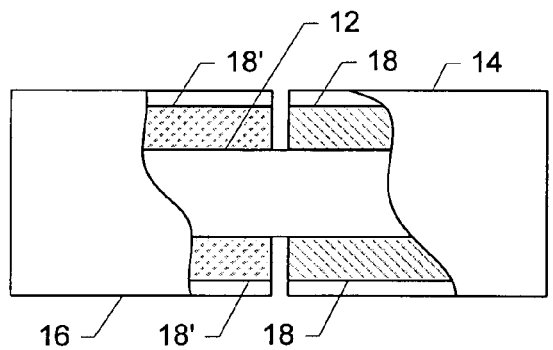

FIG. 1 is an oblique view of a first illustrative embodiment of elastomeric hinge 10 constructed in accordance with the principles of the present invention. FIGS. 2A and 2B, show an end view and a partial cut-away side view of elastomeric hinge 10. Referring to FIGS. 1 and 2 together, elastomeric hinge 10 includes inner member 12 having a generally square cross section. Outer members 14 and 16 are disposed about and overlap, but are rotated about their respective longitudinal axes by approximately 45 degrees relative to inner member 12. As used herein, two objects overlap when at least a portion of one element extends inside a portion of the other object.

Preferably, inner member 12 and outer members 14 and 16 are tubes manufactured of metal, plastic, or other suitable material. Inner member 12 is shown as being a hollow tube, but may also be made of a solid bar. Outer members 14 and 16 preferably comprise square shaped tubes, but only the inner surface need be generally square in cross section and the outer surface may have other shapes as appropriate for the end use of elastomeric hinge 10. Although, the corresponding surfaces of inner member 12 and outer members 14 and 16 are preferrably square-shaped in cross section, this need not be the case, and other geometrical shapes such as a triangle, pentagon, hexagon, and so on, may also be used.

Outer members 14 and 16 are prefereably approximately concentric with inner member 12. This configuration provides the the most predictable hinge-axis behavior, in that the hinge-axis remains substantially stationary as the hinge is operated. However, under some circumstances, it may be desireable to laterally or vertically offset one or more of the tube axes when manufacturing the hinge. This may be used, for example, so that the axes become aligned when the hinge is used in a situation in which a large static load is present.

Elastomeric elements 18 and 18' are disposed between inner member 12 and outer members 14 and 16, respectively. Elastomeric elements 18 and 18' are preferably cylindrical rods of natural rubber, but may be made of synthetic rubber or other elastomeric material and may have non-round cross sections. Elastomeric elements 18 and 18' may also be composite structures in which different materials are used along their lengths or through their thicknesses. Preferably, elastomeric elements 18 and 18' are pre-loaded in compression upon assembly of elastomeric hinge 10. Advantageously, the pre-compression of elastomeric elements 18 serves to retain them in between inner member 12 and outer members 14 and 16 without the need to bond elastomeric elements 18 to the inner or outer element using adhesives or the like.

In use, one of outer members 14 and 16 is attached to the body or frame of a motor vehicle, while the other outer member is attached to movable panel or cover, such as the hood or trunk. Outer members 14 and 16 may be attached to their respective parts of the vehicle using clamping straps or other suitable methods of securely attaching elastomeric hinge 10 to the vehicle parts. For example, flanges with a suitable bolt hole may be welded onto outer members 14 and 16, or may be formed when outer members 14 and 16 are manufactured, e.g., by extrusion or the like.

Operation of elastomeric hinge 10 is described in connection with FIG. 3, wherein outer member 16 remains stationary while outer member 14 is rotated counterclockwise through an angle $\alpha$. As outer member 14 is rotated, the inner surfaces of outer member 14 push against and tend to compress elastomeric elements 18 against the outer surfaces of inner member 12. This imparts a torque to inner member 12 tending to rotate it counterclockwise about its longitudinal axis through an angle $\beta$. As inner member 12 rotates, the outer surfaces of inner member 12 push against and tend to compress elastomeric elements 18' against the inner surfaces of outer member 16. Because outer member 16 remains stationary, the force arising from the compression of elastomeric elements 18 and 18' tend to counteract the force tending to rotate outer member 14, for example, the weight of a vehicle hood.

Figure 3:
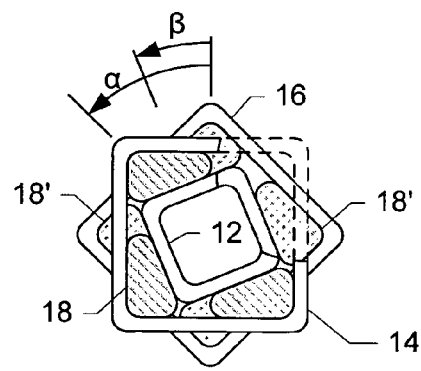
FIG. 3 is an an view of the hinge of FIG. 1 in a rotated position.

In FIG. 3, the rotation of inner member 12 is shown to be approximately half that of outer member 14. That is, angle $\beta$ is approximately one half of angle $\alpha$. However, the actual relationship depends upon the relative compliance of elastomeric elements 18 and 18'. If elastomeric elements 18 and 18' are substantially identical, then the relative rotation angles will be as shown in FIG. 3. A hinge so constructed would tend to have a counteracting force that increases smoothly as the hinge is operated.

However, if elastomeric elements 18 and 18' differ significantly, then the rotation angles $\alpha$ and $\beta$ will also differ. For example, elastomeric elements 18' may be made of a material that is significantly less compliant, i.e., stiffer, than the material used for elastomeric elements 18. In such a hinge, inner member 12 would not rotate significantly as outer element 14 is rotated, until the torque imparted on inner element 12 by elastomeric elements 18 has risen enough to begin compressing elastomeric elements 18'. A hinge so constructed would have a lower counteracting force during an initial rotation as the more compliant elastomeric elements 18 are compressed, and a higher counteracting force during a later portion of the rotation as the less compliant elastomeric elements 18' are compressed. Similar effects may be attained by changing the dimensions, e.g., the length, of elastomeric elements 18' so that they differ from those of elastomeric elements 18.

Figure 4:
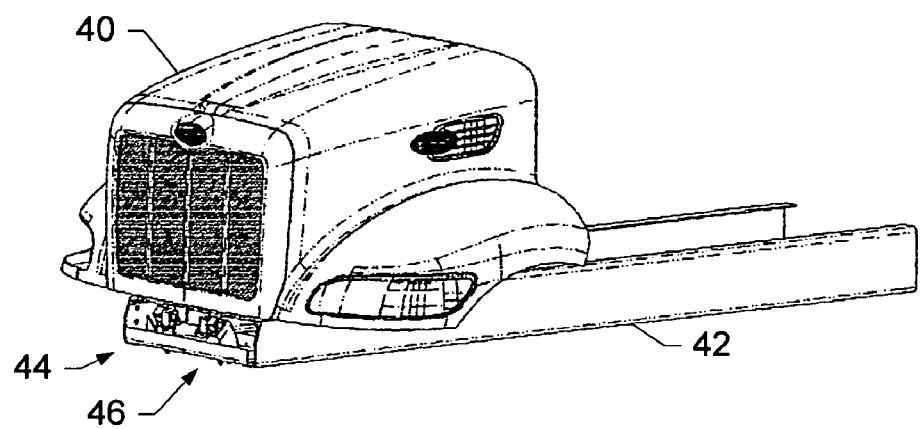
FIG. 4 is an oblique view of a truck frame and forward tilting hood coupled by a hinge in accordance with the principles of the present invention.
Figure 5:
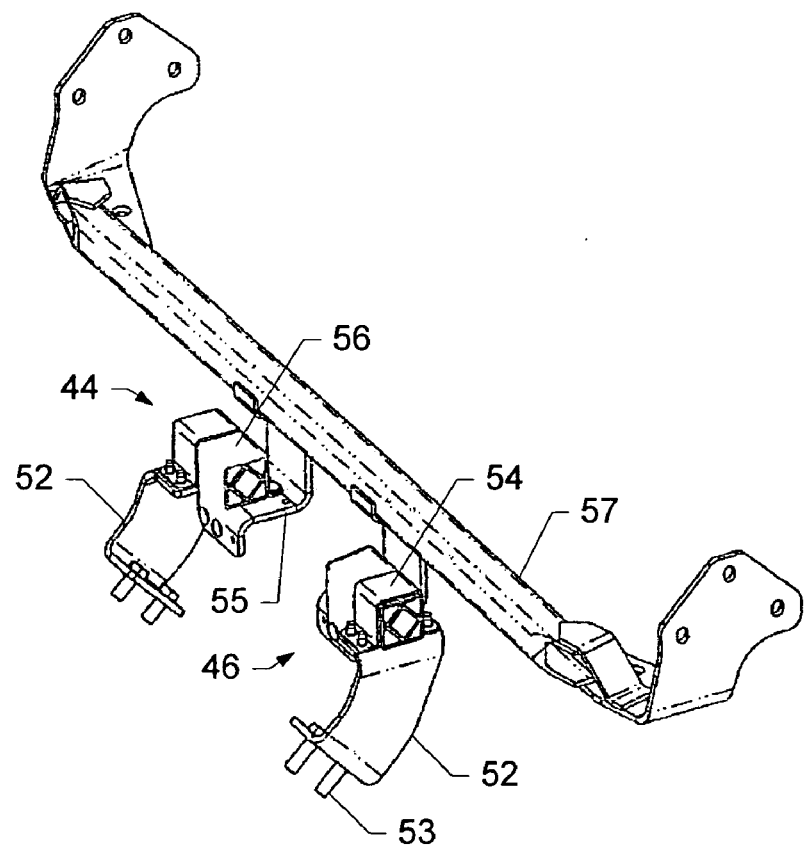
FIG. 5 is an oblique view of the hinge assembly of FIG. 4, shown in more detail and with some obscuring structures removed.

An elastomeric hinge such as that shown in FIGS. 1–3 may advantageously be used as a hinge for a truck hood as shown in FIG. 4, wherein hood 40 is shown coupled to frame 42 by a pair of elastomeric hinges 44 and 46. A more detailed view of the structure of the hinge joint is shown in FIG. 5.

Brackets 52 are attached to the truck frame by suitable means such as bolts 53. One end of each of elastomeric hinges 44 and 46 is attached to brackets 52 using clamping straps 54, and the other end is similarly attached to brackets 55 using clamping straps 56. Brackets 55 are attached to cross member 57 which in turn is attached to truck hood 40 of FIG. 4.

Figure 6:
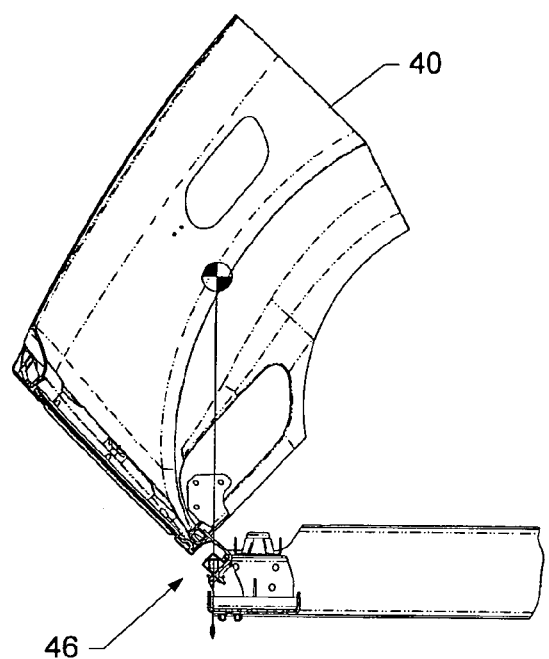
FIGS. 6, 7, and 8 are sectional views of the truck frame and hood of FIG. 4, showing the hood in intermediate, closed, and open positions, respectively.
Figure 7:
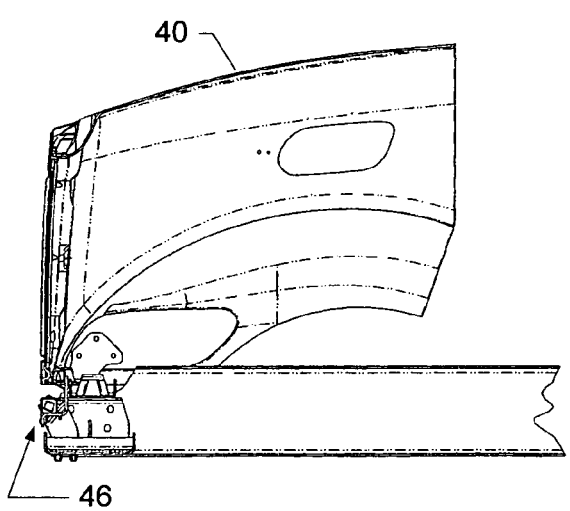
Figure 8:
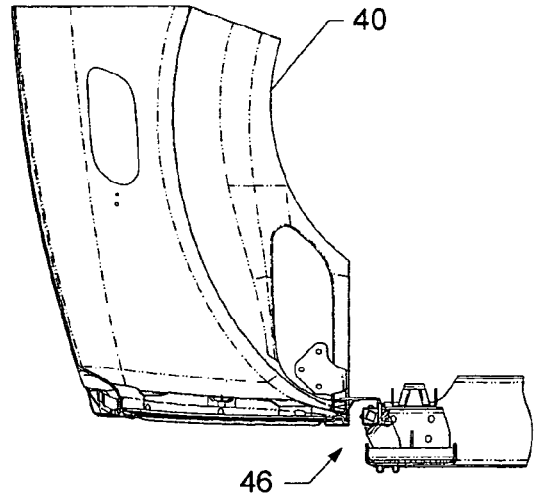

Upon consideration of FIG. 3, it is readily apparent that elastomeric hinge 10 is symmetrical with respect to rotation of outer member 14. That is, rotation of outer member 14 in either a clockwise or counterclockwise direction gives rise to a counteracting force due to elastomeric elements 18 and 18'. This characteristic of the elastomeric hinge of the present invention may be used advantageously to provide assistance when both opening and closing truck hood 40 of FIG. 4. For example, in FIG. 6 elastomeric hinge 46 and truck hood 40 are configured so that when the center of mass of truck hood 40 is vertically centered over the pivot axis of elastomeric hinge 46, elastomeric hinge 46 is in its neutral position. In this configuration, fully closing truck hood 40 rotates elastomeric hinge 46 in one direction, whereas fully opening truck hood 40 rotates elastomeric hinge 46 in the other direction. In each case, compression of elastomeric elements 18 of elastomeric hinge 46 creates a force acting against the rotation of hood 40, as shown in FIGS. 7 and 8.

Figure 9:
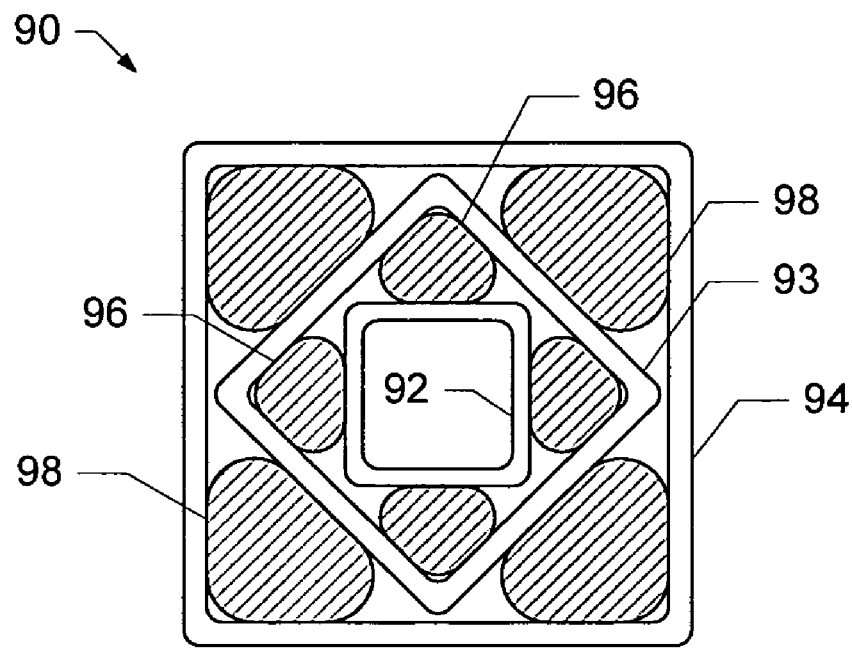
FIGS. 9 and 10 are, respectively, end and cut-away side views of another illustrative embodiment of a hinge joint in accordance with the principles of the present invention.
Figure 10:
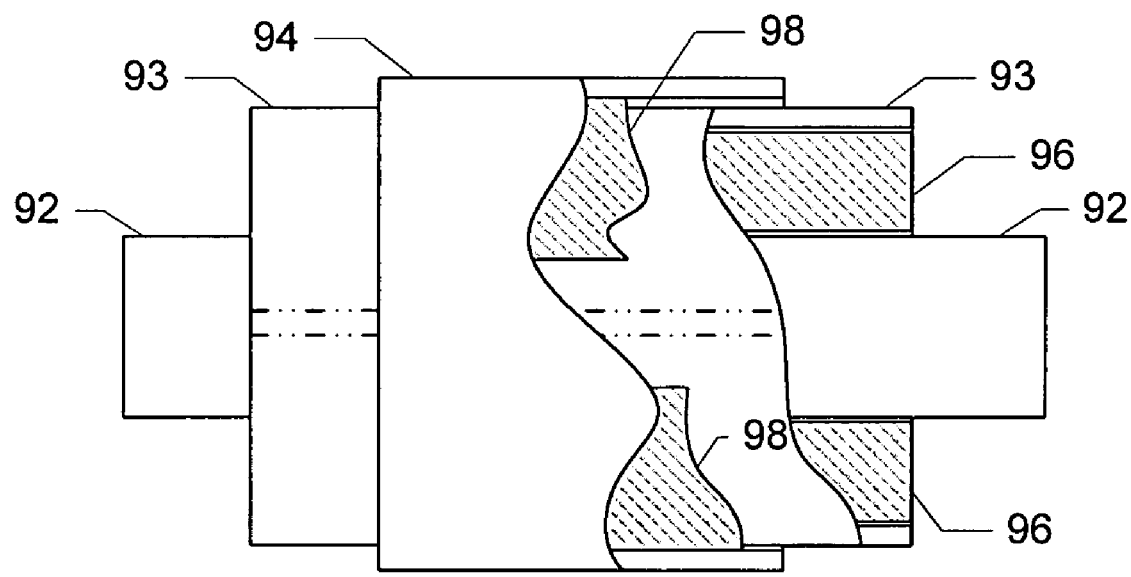

FIG. 9 shows an alternative embodiment of an elastomeric hinge constructed in accordance with the principles of the present invention. Elastomeric hinge 90 is formed of three generally concentric tubes including inner member 92, middle member 93, and outer member 94. Elastomeric elements 96 are disposed between inner member 92 and middle member 93, and elastomeric elements 98 are disposed between middle member 93 and outer member 94. FIG. 10 is a side view of elastomeric hinge 90, showing the interior components of elastomeric hinge 90 in partial cutaway.

In use, elastomeric hinge 90 is typically configured so that inner member 92 and outer member 94 are coupled to a vehicle hood and body. Rotation of the inner member 92 relative to middle member 93 causes compression of elastomeric elements 96 thereby imparting a torque to middle member 93. Rotation of middle member 93 relative to outer member 94 causes compression of elastomeric elements 98.

Outer member 94 is prevented from rotating because it is fixedly attached to the vehicle body. The compression of elastomeric elements 98, therefore, causes a torque or force tending to counteract the compression.

It should be noted that the different dimensions of elastomeric elements 96 and 98 may cause them to have different compliance characteristics. Accordingly, the assisting force provided by elastomeric hinge 90 may vary significantly as it is operated from fully open to fully shut. This characteristic may be advantageous in that the assisting force may be larger when a hood or other cover is fully open or fully shut, while the assisting force is near minimum when the hood is at an intermediate position. Alternatively, the dimensions or materials of elastomeric elements 96 and 98 may be chosen so that their respective compliance characteristics are similar and the assisting force varies gradually over the operating range of hinge 90.

Thus, an elastomeric hinge particularly suited for use in motor vehicles has been disclosed. It will be readily apparent that the elastomeric hinge thus disclosed may be useful for other applications and that various modifications may be made to the disclosed embodiment without departing from the spirit and scope of the invention. Accordingly, one will understand that the description provided herein is provided for purposes of illustration and not of limitation, and that the invention is limited only be the appended claims.

What is claimed is:

1. A hinge comprising:
   a first tubular member;
   a second tubular member juxtaposed in an overlapping and concentric relation to the first tubular member;
   a first plurality of elastomeric members disposed between the first and second tubular members;
   a third tubular member juxtaposed in an overlapping and concentric relation to the second tubular member; and
   a second plurality of elastomeric members disposed between the second and third tubular members.

2. The hinge of claim 1, wherein the first, second, and third tubular members have a substantially square cross-section, and wherein the first and third tubular members are rotated about their respective longitudinal axes relative to the second tubular member.

3. The hinge of claim 2, wherein the third tubular member is juxtaposed in an end-to-end relation to the first tubular member.

4. The hinge of claim 3, wherein the first and third tubular members are disposed around the second tubular member.

5. The hinge of claim 4, wherein the first and second pluralities of elastomeric members are pre-compressed.

6. The hinge of claim 4, wherein the first plurality of elastomeric members have different compliance characteristics than the second plurality of elastomeric members.

7. The hinge of claim 4, wherein a length of the first and third tubular members are approximately equal.

8. The hinge of claim 2, wherein the third tubular member is juxtaposed in an overlapping and concentric relation to the first tubular member.

9. The hinge of claim 8, wherein a length of the first tubular member is longer than a length of the third tubular member.

10. The hinge of claim 8, wherein a length of the first plurality of elastomeric members is longer than a length of the second plurality of elastomeric members.

11. The hinge of claim 2, wherein the first tubular member is oriented such that longitudinal sides thereof are juxtaposed opposite longitudinal corners of the second tubular member, and the second tubular member is oriented such that longitudinal sides thereof are juxtaposed opposite longitudinal corners of the third tubular member.

12. Apparatus for coupling a hatch to a vehicle, the apparatus comprising:
   at least one hinge comprising:
      a first tubular member coupled to a frame of the vehicle;
      a second tubular member coupled to the hatch;
      a third tubular member juxtaposed in an overlapping relation with the first and second tubular members;
      a first plurality of cushioning members disposed between the first and third tubular members such that relative rotation of the first and third tubular members about their longitudinal axes causes compression of the first plurality of cushioning members; and
      a second plurality of cushioning members disposed between the second and third tubular members such that relative rotation of the second and third tubular members about their longitudinal axes causes compression of the second plurality of cushioning members.

13. The apparatus of claim 12, wherein the first, second, and third tubular members have cross sections comprised of alternating sides and corners, and
   wherein the first, second, and third tubular members are configured such that a corner of the first tubular member is juxtaposed opposite a side of the second tubular member, and a corner of the second tubular member is juxtaposed opposite a side of the third tubular member.

14. The apparatus of claim 12, wherein the at least one hinge comprises a pair of spaced apart hinges disposed along a common axis.

15. The apparatus of claim 12, wherein the at least one hinge has a neutral angle in which the first and second plurality of cushioning members are not under compression caused by rotation of the first, second, or third tubular members.

16. The apparatus of claim 15, wherein the hatch, vehicle, and at least one hinge are configured such that when the at least one hinge is at the neutral angle the center of mass of the hatch is positioned approximately vertically above an axis of the at least one hinge.

17. The apparatus of claim 12, wherein at least one of the first and second tubular members is not concentric with the third tubular member.

18. The apparatus of claim 12, wherein the first and second plurality of cushioning members have different cushioning properties.

19. The apparatus of claim 12, wherein at least one of the first and second plurality of cushioning members are composites.

20. The apparatus of claim 12, wherein at least one of the first and second plurality of cushioning members comprises cushioning members of at least two different types.

* * * * *